(12) United States Patent
Tovchigrechko

(10) Patent No.: US 11,288,543 B1
(45) Date of Patent: Mar. 29, 2022

(54) SYSTEMS AND METHODS FOR DEPTH REFINEMENT USING MACHINE LEARNING

(71) Applicant: Facebook Technologies, LLC, Menlo Park, CA (US)

(72) Inventor: Andrey Tovchigrechko, Saratoga, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/787,852

(22) Filed: Feb. 11, 2020

(51) Int. Cl.
*G06K 9/00* (2006.01)
*G06K 9/62* (2022.01)
*G06K 9/46* (2006.01)

(52) U.S. Cl.
CPC ....... *G06K 9/6257* (2013.01); *G06K 9/00208* (2013.01); *G06K 9/4604* (2013.01); *G06K 9/6232* (2013.01)

(58) Field of Classification Search
CPC ............ G06K 9/6257; G06K 9/00208; G06K 9/6232; G06K 9/4604
USPC ................................................ 382/155–161
See application file for complete search history.

(56) References Cited

U.S. PATENT DOCUMENTS

| | | | |
|---|---|---|---|
| 2015/0043808 A1* | 2/2015 | Takahashi | G06T 5/50 382/154 |
| 2017/0302910 A1* | 10/2017 | Richards | H04N 13/239 |
| 2020/0193166 A1* | 6/2020 | Russo | G06T 7/194 |

OTHER PUBLICATIONS

Eldesokey, Abdelrahman, Michael Felsberg, and Fahad Shahbaz Khan. "Confidence Propagation through CNNs for Guided Sparse Depth Regression." IEEE Transactions on Pattern Analysis and Machine Intelligence (2019) (Year: 2019).*

* cited by examiner

*Primary Examiner* — Andrew M Moyer
(74) *Attorney, Agent, or Firm* — Baker Botts L.L.P.

(57) ABSTRACT

In one embodiment, a system may capture one or more images of an object using one or more cameras. The system may detect features of the object depicted in the one or more images. The system may compute, based on the detected features in the one or more images, depth measurements for the object. The system may generate confidence scores associated with the depth measurements. The system may refine the computed depth measurements of the object by processing the depth measurements, the associated confidence scores, and at least one of the one or more images using a machine-learning model trained to refine depth measurements. The trained machine-learning model is configured to process one or more input images to refine the processed depth measurements in the input images.

18 Claims, 11 Drawing Sheets

SYSTEMS AND METHODS FOR DEPTH REFINEMENT USING MACHINE LEARNING

TECHNICAL FIELD

This disclosure generally relates to computer vision and machine learning.

Background

Nowadays depth computations have become important in various fields, such as computer vision or image-based 3D reconstruction, and now faces several challenges. Existing methods for computing the depth of objects captured in images have limitations. For example, stereo depth estimation techniques, whether passive or active, have difficulty measuring the depth of an object which lacks trackable feature, such as a plain wall, small or thin objects, hair, black objects, reflections, horizontal edges, and objects with repeating patterns. In addition, imaging artifacts (e.g., glares, overexposure, complex light sources, etc.) further make stereo-depth estimations difficult.

SUMMARY OF PARTICULAR EMBODIMENTS

To address the foregoing problems, disclosed are methods, apparatuses, and a system, to refine depth measurements. The present disclosure provides a method to refine depth measurements using a machine-learning model, which may be trained using supervised or unsupervised learning. The method disclosed in the present application may use the trained machine-learning model to refine the depth measurements generated based on captured images to improve the accuracy and resolution of the depth measurements. Furthermore, the method disclosed in the present application focuses on conducting the depth refinements to certain categories of objects, such as objects with failed depth measurements.

The embodiments disclosed herein are only examples, and the scope of this disclosure is not limited to them. Particular embodiments may include all, some, or none of the components, elements, features, functions, operations, or steps of the embodiments disclosed herein. According to one embodiment of a method, the method comprises, by a computing system, capturing one or more images of an object using one or more cameras. The method further comprises detecting features of the object depicted in the one or more images. The method yet further comprises computing, based on the detected features in the one or more images, depth measurements for the object. The method additionally comprises generating confidence scores associated with the depth measurements. The method further comprises refining the computed depth measurements of the object by processing the depth measurements, the associated confidence scores, and at least one of the one or more images using a machine-learning model trained to refine depth measurements.

In one embodiment, refining the computed depth measurements comprises utilizing at least one of the one or more images of the object, a corresponding depth map computed based on the computed depth measurements, and a corresponding confidence map based on the associated confidence scores, as input, and generating a refined depth map based on the input to refine the computed depth measurements.

In one embodiment, the machine-learning model is trained by comparing the refined depth map to the corresponding depth map to update the machine-learning model.

In one embodiment, the machine-learning model is trained by generating refined depth measurements for a captured image, generating an estimated subsequent image in a sequence of images based on the refined depth measurements for the captured image and a pose shift between the captured image and a captured subsequent image, and comparing the estimated subsequent image to the captured subsequent image to update the machine-learning model.

In one embodiment, the machine-learning model is trained by generating refined depth measurements for a captured image, generating an estimated subsequent image in a sequence of images based on a predicted pose at the estimated subsequent image and the refined depth measurements for the captured image, generating an estimated previous image in the sequence of images based on a predicted pose at the estimated previous image and the refined depth measurements for the captured image, and comparing the estimated subsequent image to a captured subsequent image and comparing the estimated previous image to a captured previous image to update the machine-learning model. Furthermore, the comparing step comprises calculating a first loss between the estimated subsequent image and the captured subsequent image, calculating a second loss between the estimated previous image and the captured previous image, and training the machine-learning model using a smaller loss selected from the first loss and the second loss.

In one embodiment, the predicted pose at the estimated subsequent image is generated based on a pose shift between the captured image and the captured subsequent image, and the predicted pose at the estimated previous image is generated based on a pose shift between the captured previous image and the captured image.

In one embodiment, generating the estimated subsequent image comprises reprojecting the captured image using the refined depth measurements for the captured image and the pose shift between the captured image and the captured subsequent image.

In one embodiment, the pose shift is determined using simultaneous localization and mapping (SLAM).

In one embodiment, refining the computed depth measurements comprises utilizing at least one of a current frame of the object, depth measurements of the current frame, corresponding confidence scores associated with the depth measurements of the current frame, and refined depth measurements of a previous frame reprojected to the machine-learning model for refining depth measurements of the current frame, as input; and generating refined depth measurements of the current frame based on the input via the machine-learning model. Furthermore, the input further comprises pre-computed depth measurements of static objects which are reprojected to the machine-learning model for refining depth measurements of the current frame.

In one embodiment, the object is hair, glass, flat surfaces, large surfaces, small or thin objects, black objects, repeating patterns, horizontal edges, glares, or overexposed images.

In one embodiment, the updated deep-learning model is configured to generate images for television monitors, cinema screens, computer monitors, mobile phones, or tablets.

Embodiments according to the invention are in particular disclosed in the attached claims directed to a method, a storage medium, a system and a computer program product, wherein any feature mentioned in one claim category, e.g. method, can be claimed in another claim category, e.g.

system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the present disclosure and their embodiments may provide solutions to these or other challenges. There are, proposed herein, various embodiments which address one or more of the issues disclosed herein. The methods disclosed in the present disclosure may provide a machine-learning model to refine depth measurements computed based on an image, so that the accuracy of the depth measurements is improved. The machine-learning model disclosed in the present disclosure can be trained by various ways, such as a supervised learning, an unsupervised learning, and a training method for occlusion detection. In addition, the machine-learning model can perform the depth refinements specific to those objects which lack trackable features or have in correct ground-truth depth measurements, such that smaller convolutional neural networks can be applied to this machine-learning model. Therefore, the refined depth measurements rendered by the trained machine-learning model of the present disclosure can be accurate, efficient, and be able to provide real-time updates using smaller neural networks.

Particular embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The accompanying drawing figures incorporated in and forming a part of this specification illustrate several aspects of the disclosure, and together with the description serve to explain the principles of the disclosure.

DESCRIPTION OF EXAMPLE EMBODIMENTS

Figure 1:
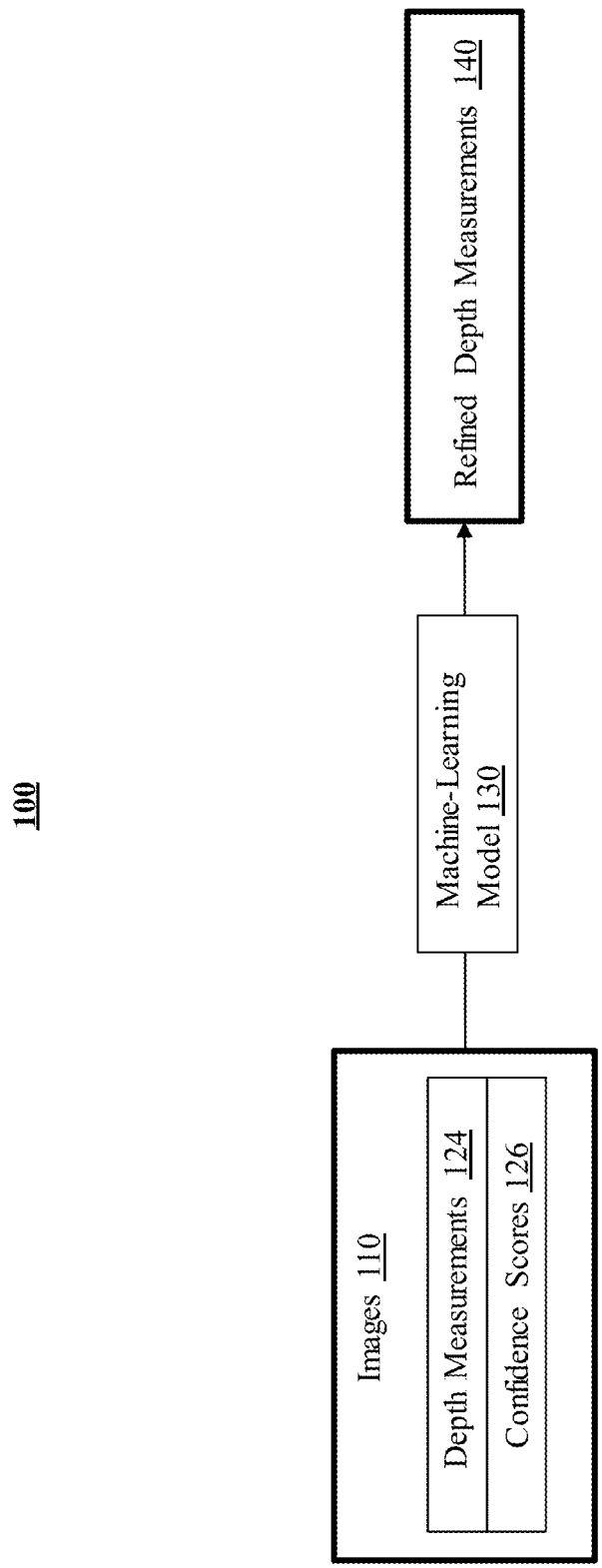
FIG. 1 illustrates an example diagram of a depth refining system by processing input images.

Current methods for computing depth measurements face several deficiencies. For example, conventional methods, e.g., a stereo depth estimation, for computing depth based on an image have difficulty computing depth for an object lacking trackable features. Particular embodiments disclosed in the present disclosure provide various methods to train a machine-learning model to refine depth measurements. The present disclosure includes, but is not limited to, certain embodiments to illustrate training methods for the machine-learning model for depth refinements. The trained machine-learning model disclosed in the present disclosure can conduct depth refinements to specific objects, which might have several failed depth measurements in the previous frames, such as hair, glass, flat surfaces, large surfaces, small or thin objects, black objects, repeating patterns, horizontal edges, glares, or overexposed images.

Particular embodiments disclosed in the present disclosure provide a supervised-learning method to train a machine-learning model. The model may be trained using at least one RGB image, depth measurements computed using traditional methods, and confidence scores for each pixel in the image as input, and comparing the output, e.g., a refined depth map, to a ground-truth depth map.

Furthermore, particular embodiments disclosed in the present disclosure provide an unsupervised-learning method to train a machine-learning model to obviate the need for ground-truth data. The model may be trained by reprojecting the refined depth measurements for a particular frame N to generate an estimated frame N+1 and comparing it to a true frame N+1 captured by a camera. More specifically, the training system may use the machine-learning model to process data associated with frame N (e.g., RGB or grayscale pixel data, raw depth measurements generated by traditional methods, and/or corresponding confidence scores for the depth measurements) to generate refined depth measurements for frame N. The training system may then generate an estimated frame N+1 based on the refined depth of frame N and a pose shift between frame N and frame N+1. The system may compare the estimated frame N+1 with a true frame N+1 to train the machine-learning model.

The unsupervised method for training may be susceptible to errors due to occlusions. For example, particular embodiments disclosed in the present disclosure provide a method to train a machine-learning model to account for occlusions in depth measurements by comparing at least two estimated frames to their corresponding captured frames and updating the machine-learning model with a smaller loss from the comparisons. By refining depth measurements using the trained machine-learning model, particular embodiments may generate desired outputs with accuracy and less computation.

As discussed above, particular embodiments may use a trained machine-learning model to generate the desired outputs. Particular embodiments of the machine-learning model can be trained and applied to various imagery tasks for computational displays by changing the input and output of the network. In particular embodiments, the machine-learning model may be based on a convolutional neural network. In other embodiments, the machine-learning model may be an autoencoder, a generative adversarial network, or any other suitable deep-learning architecture.

FIG. 1 illustrates an example depth refining system architecture, in accordance with certain embodiments. The depth refining system 100 may be implemented in any wearable devices (e.g., a head-mounted display, etc.). In particular embodiments, the depth refining system 100 may be provided to any computing system (e.g., an end user's device, such as a smartphone, virtual reality system, gaming system, etc.), and be paired with a camera in the wearable device. The depth refining system 100 comprises one or more cameras and at least one processor/module to process input images for refining depth measurements. The camera of the depth refining system 100 may be configured to capture one or more images 110 of an object. In particular embodiments, the camera may capture a series of frames of the object. For example, the camera would capture a series of frames of a user within a certain time duration or a period of time, so that the series of frames of the user can indicate a movement of the user in this period of time. Furthermore, the camera can also capture images of the object from difference perspectives. For example, a user can wear a head-mounted device with a camera to capture images of an object from different angles or perspectives by tilting head or walking around the object, e.g., the inside-out tracking. The depth refining system may comprise one or more cameras and at least one processor/module to perform the inside-out tracking, e.g., simultaneous localization and mapping (SLAM), based on the captured frames for the user, such that the depth refining system may be able to provide a pose information using SLAM to improve the accuracy of the refined depth measurements. On the other hand, multiple cameras implemented in or fixed to an environment can capture images of the object from different viewpoints, e.g., the outside-in tracking.

The depth refining system 100 receives one or more images 110 captured by one or more cameras and processes the one or more images 110 to generate depth measurements 124 of objects captured in the images 110. In particular embodiments, the images 110 may be stereo images. The depth refining system 100 detects features of object depicted in the images 110 and estimate their depths 124 using stereo-depth estimation techniques (whether passive or active, such as with the assistance of structured light patterns). In particular embodiments, the depth measurements 124 may have associated confidence scores 126. In particular embodiments, the confidences scores 126 may be used to generate a corresponding per-pixel confidence map for the depth measurements 124. For example, the object might be a table in an indoor environment, and a corner of the table may be one of the detected features which have a higher confidence score, e.g., a reliable feature for measuring depth. Based on the confidence scores associated with their corresponding depth measurements, the corresponding confidence map can be rendered. Under certain scenarios, a corresponding confidence map of the object might not be for every pixel. For example, a detected feature may be a region consisting of a number of pixels.

In particular embodiments, the confidence scores 126 may be used to filter out unreliable depth measurements, so that the final depth measurements 124 meet certain reliability criteria. In particular embodiments, the depth measurements may be represented as a per-pixel depth map. Under certain scenarios, a corresponding depth map of the object might not be for every pixel. For example, a depth measurement may be performed based on a portion of the object consisting of a number of pixels.

As previously mentioned, the raw depth measurements 124 may be noisy, incomplete, and/or inaccurate, so particular embodiments refine the depth measurements 124 using machine learning. In particular embodiments, a machine-learning model 130 (e.g., a convolutional neural network or any other suitable machine-learning models) may take as input: the depth measurements 124 (e.g., which could be represented as a depth map), one or more of the images 110 from which the depth measurements 124 are computed (e.g., the left image of the stereo image pair used for computing depth 124), and the associated confidence scores 126 (e.g., which may be represented by a corresponding confidence map). The machine-learning model 130 may be trained to process the input data and output refined depth measurements 140. In particular embodiments, certain objects which do not have significant features often render an incorrect raw/ground-truth depth measurements 124, the machine-learning model 130 in the particular embodiments may perform depth refinements specific to these objects, instead of performing depth refinements to every object in the captured images. For example, the machine-learning model 130 may refine depth measurements 124 which their confidence scores 126 are lower than a specific threshold. By doing so, the machine-learning model 130 can avoid generating a large number of artifacts, and therefore, a smaller convolutional neural network can be applied to the machine-learning model 130 which enables real-time updates. For example, the refined depth measurements 140 for a frame N could be fed back to the machine-learning model 130 and be used as input for depth refinements of a next frame N+1. Detailed operations and actions of training the machine-learning model 130 may be further described in FIGS. 2 to 9.

In particular embodiments, the depth refining system 100 may be implemented in any suitable computing device, such as, for example, a server, a personal computer, a laptop computer, a cellular telephone, a smartphone, a tablet computer, an augmented/virtual reality device, a head-mounted device, a portable smart device, a wearable smart device, or any suitable device which is compatible with the depth refining system 100. In the present disclosure, a user/object which refines/computes depth measurements may be referred to a device mounted on a movable object, such as a vehicle, or a device attached to a person. In the present disclosure, a user may be an individual (human user), an entity (e.g., an enterprise, business, or third-party application), or a group (e.g., of individuals or entities) that interacts or communicates with the depth refining system 100. In particular embodiments, the camera of the depth refining system 100 may be implemented in a head-mounted device, and the processor/module which performs depth refinements may be implemented in a central module separated from the head-mounted device. In particular embodiments, the head-mounted device comprises one or more modules configured to implement the camera and the processor configured to perform depth refinements.

This disclosure contemplates any suitable network to connect each element in the depth refining system 100 or to connect the depth refining system 100 with other systems. As an example and not by way of limitation, one or more portions of network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network may include one or more networks.

In particular embodiments, the machine-learning model for depth refinement may be trained using known ground-truth depth measurements, e.g., a supervised learning method. Considering that the ground-truth depth measurements could be hard to obtain, e.g., requiring advanced computation methods, particular embodiment may also be trained without ground-truth depth measurements, e.g., an unsupervised learning method.

Figure 2:
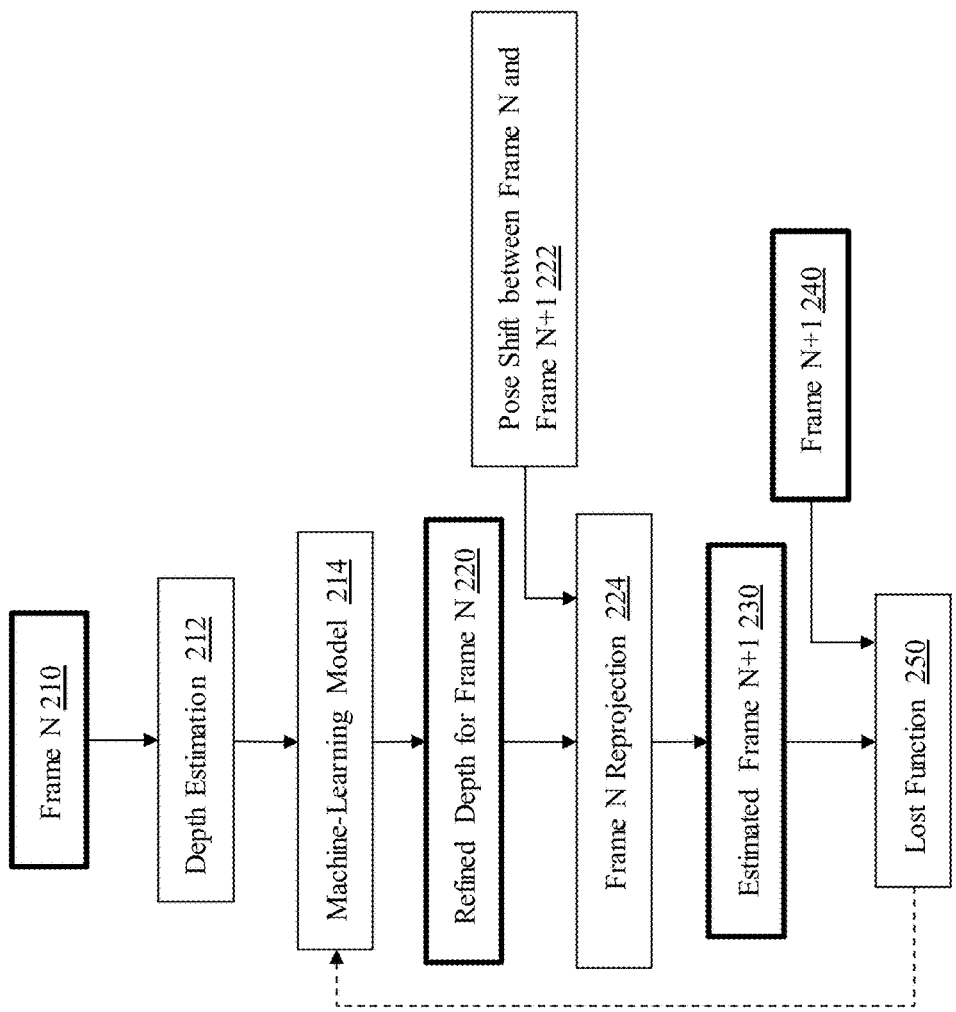
FIG. 2 illustrates an example diagram of a training module for training a machine-learning model to refine depth measurements without ground truth.

FIG. 2 illustrates an example training module for training a machine-learning model for depth refinements without ground truth, in accordance with certain embodiments. The depth refining system comprises a training module 200. In particular embodiments, the training module 200 comprises a camera, a depth estimation unit, a refining unit, a pose estimation unit, a reprojection unit, and a loss function unit for training the machine-learning model.

The camera of the training module 200 may capture a frame N 210 of any object(s) for depth measurements. In particular embodiments, the camera may capture a series of frames of the object, e.g., the frame N 210 and a frame N+1 240. In particular embodiments, the frame N 210 and the frame N+1 240 may be sequential frames. For example, the frame N 210 is a frame which is captured earlier than the frame N+1 240. The frame N 210 and the frame N+1 240 may have any number of frames in between. The frame N 210 is not necessarily followed by the frame N+1 240 directly, but could be several frames apart from the frame N+1 240.

The depth estimation unit of the training module 200 receives the captured frame N 210 from the camera and estimates depth measurements 212 of the frame N 210. In particular embodiments, the estimated depth measurements 212 may be measured by various methods, e.g., LiDAR, stereo vision measurements, structured-light assisted computations, manual measurements, and the like. In particular embodiments, the estimated depth measurements 212 may be ground-truth/raw measurements and have associated confidence scores. In particular embodiments, the confidence score may indicate how reliable its corresponding depth measurement is.

The refining unit of the training module 200 may generate refined depth measurements 220 for the frame N 210 based on the estimated depth measurements 212 for the frame N 210 via a machine-learning model 214. In particular embodiments, the machine-learning model 214 may refine the estimated depth measurements 212 for the frame N 210 based on the captured frame N 210, the estimated depth measurements 212, and associated confidence scores associated with the depth measurements 212 of the frame N 210. In particular embodiments, the frame N 210 may be an RGB image, a grayscale image, a binary image, or any suitable type and format of images which can be processed to generate depth measurements. In particular embodiments, the refined depth measurements 220 may be generated based on the methods disclosed in FIG. 1.

The pose estimation unit of the training module 200 may determine a pose shift 222 between the frame N 210 and the frame N+1 240 using SLAM. In particular embodiments, the pose shift 222 may also be provided by any other suitable units/modules. For example, the pose shift 222 may be estimated based on estimated SLAM data, which SLAM data is estimated based on sensor data, e.g., the frames captured by the camera. In particular embodiments, the pose estimation unit may determine a predicted pose at the frame N+1 240 using SLAM.

The reprojection unit of the training module 200 receives the refined depth measurements 220 for the frame N 210 from the refining unit, and receives the pose shift 222 between the frame N 210 and the frame N+1 240 from the pose estimation unit. The reprojection unit reprojects 224 the frame N 210 based on the refined depth measurements 220 for the frame N 210 and the pose shift 222 between the frame N 210 and the frame N+1 240, and generates an estimated frame N+1 230. In particular embodiments, the reprojection unit reprojects 224 the frame N 210 based on the refined depth measurements 220 for the frame N 210 and the predicted pose at the frame N+1 240 to generate the estimated frame N+1 230. The estimated frame N+1 230 depicts how the scene captured by the frame N 210 would likely appear if viewed from the user's new pose at the time the frame N+1 240 is captured.

The loss function unit of the training module 200 receives the estimated frame N+1 230 from the reprojection unit, and receives the captured frame N+1 240 from the camera. The loss function unit compares the estimated frame N+1 230 to the captured frame N+1 240, and calculates a loss between the estimated frame N+1 230 and the captured frame N+1 240 based on a loss function. The loss function unit may update/train the machine-learning model 214 with the loss calculated based on the estimated frame N+1 230 and the captured frame N+1 240. Detailed operations and actions of training the machine-learning model 214 performed at the training module 200 may be further described in FIG. 7.

The unsupervised training method described above has the advantage of not needing ground-truth training data, which could be costly to obtain. However, one potential issue with the method is that the captured frame N+1 240 may be different from the estimated frame N+1 230 for reasons unrelated to the accuracy of the refined depth and the performance of the machine-learning model 214. For example, due to the passage of time and the change in pose, certain objects or portions thereof that appear in the captured frame N 210 may not be visible in the captured frame N+1 240. This could be caused by any number of reasons. For example, when the frame N 210 is captured, the pose of the user (or camera) may have a direct view of an object. But when the frame N+1 240 is captured, the new pose of the user (or camera) may result in the object being occluded by another object or move out of the field of view of the user. In such cases, comparing the captured frame N+1 210 to the estimated frame N+1 230 could result in an erroneously large loss, since the difference between the frames is not entirely attributable to the correctness of the refined depth measurements 220 and the machine-learning model 214.

Figure 3:
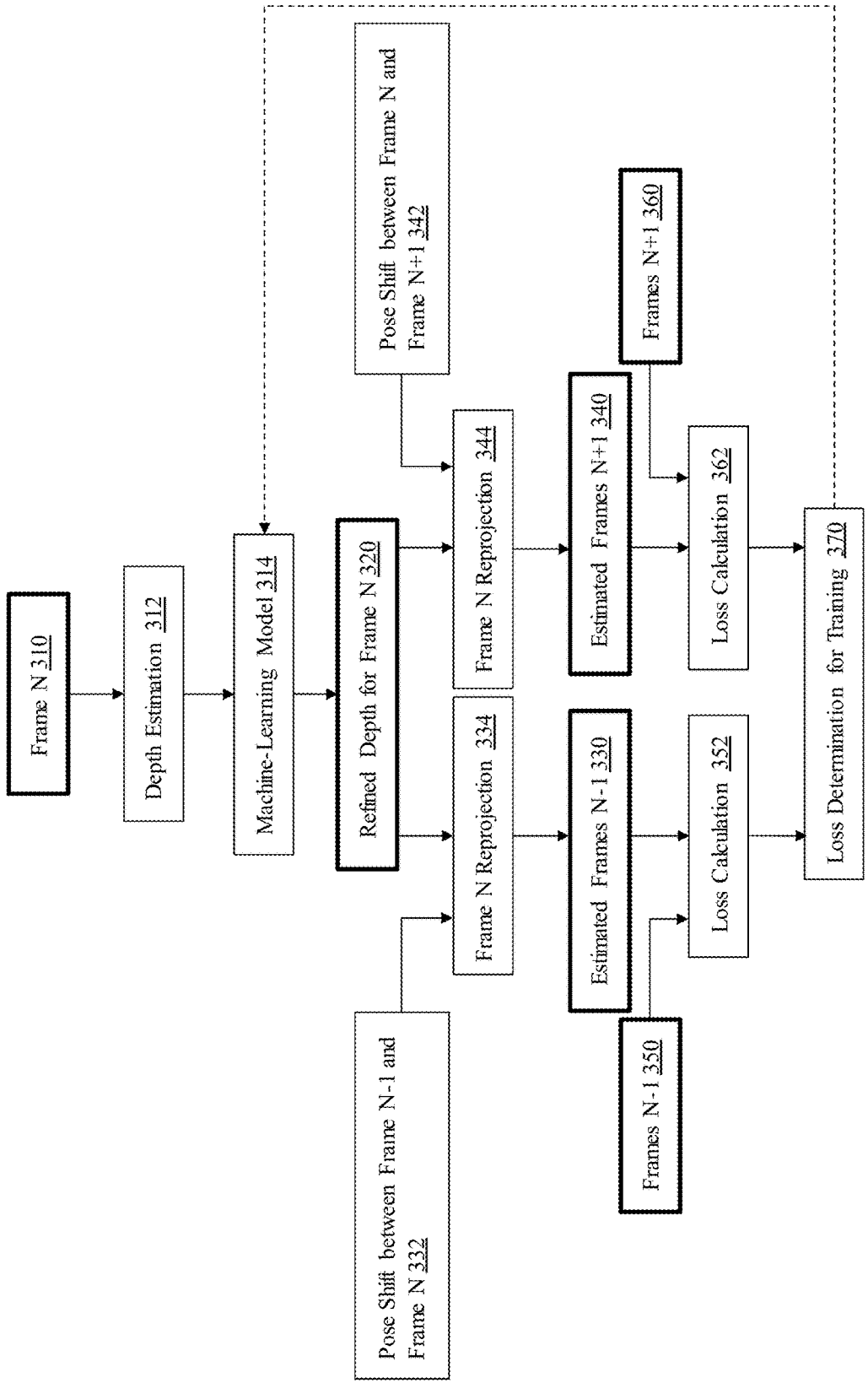
FIG. 3 illustrates an example diagram of a training module for training a machine-learning model to exclude occlusions in depth measurements.

FIG. 3 illustrates an example training method for training a machine-learning module that mitigates justifiable differences between the estimated frame and the captured frame, in accordance with certain embodiments. The training method is based on the observation that even though an object visible at frame N could be occluded at frame N+1, it is less likely that the object would also be occluded in another frame, such as frame N−1. Thus, when performing the loss computation to assess the estimated frame N+1, particular embodiments may compare the frame to multiple frames captured at different times (e.g., frame N+1 and frame N−1) and use the smallest loss to update the machine learning model.

As shown in FIG. 3, a depth refining system comprises a training module 300. The training module 300 comprises a camera, a depth estimation unit, a refining unit, a pose estimation unit, a reprojection unit, and a loss function unit for training the machine-learning model to account for occlusions in depth refinements.

The camera of the training module 300 may capture a frame N 310 of any object(s) for depth measurements. In particular embodiments, the camera may capture a series of frames of the object, e.g., a frame N−1 350, the frame N 310, and a frame N+1 360. In particular embodiments, the frame N−1 350, the frame N 310 and the frame N+1 360 may be sequential frames. For example, the frame N 310 is a frame which is captured earlier than the frame N+1 360, and the frame N−1 350 is a frame which is captured earlier than the frame N 310. The frame N−1 350, the frame N 310 and the frame N+1 360 may have any number of frames in between. For example, the frame N−1 350 is not necessarily followed by the frame N 310 directly, but could be several frames apart from the frame N 310.

The depth estimation unit of the training module 300 receives the captured frame N 310 from the camera and estimates depth measurements 312 of the frame N 310. In particular embodiments, the estimated depth measurements 312 may be measured by various methods, e.g., LiDAR, stereo vision measurements, structured-light assisted computations, manual measurements, and the like. In particular embodiments, the estimated depth measurements 312 may be ground-truth measurements and have associated confidence scores. In particular embodiments, the confidence score may indicate how reliable its corresponding depth measurement is.

The refining unit of the training module 300 may generate refined depth measurements 320 for the frame N 310 based on the estimated depth measurements 312 for the frame N 310 via a machine-learning model 314. In particular embodiments, the machine-learning model 314 may refine the estimated depth measurements 312 for the frame N 310 based on the captured frame N 310, the estimated depth measurements 312, and associated confidence scores associated with the depth measurements 312 of the frame N 310. In particular embodiments, the frame N 310 may be an RGB image, a grayscale image, a binary image, or any suitable type and format of images. In particular embodiments, the refined depth measurements 320 may be generated based on the methods disclosed in FIG. 1. The pose estimation unit of the training module 300 may determine a pose shift 332 between the frame N−1 350 and the frame N 310 and a pose shift 342 between the frame N 310 and the frame N+1 360 using SLAM. In particular embodiments, the pose shift 332, 342 may also be provided by any other suitable units/modules. For example, the pose shift 332, 342 may be estimated based on estimated SLAM data, which SLAM data is estimated based on sensor data, e.g., the frames captured by the camera. In particular embodiments, the pose estimation unit may determine predicted poses at the frames N−1 350 and N+1 360 using SLAM.

The reprojection unit of the training module 300 receives the refined depth measurements 320 for the frame N 310 from the refining unit, and receives the pose shift 332 between the frame N−1 350 and the frame N 310 and the pose shift 342 between the frame N 310 and the frame N+1 360 from the pose estimation unit. The reprojection unit reprojects 334 the frame N 310 based on the refined depth measurements 320 for the frame N 310 and the pose shift 332 between the frame N−1 350 and the frame N 310, and generates an estimated frame N−1 330. Furthermore, the reprojection unit reprojects 344 the frame N 310 based on the refined depth measurements 320 for the frame N 310 and the pose shift 342 between the frame N 310 and the frame N+1 360, and generates an estimated frame N+1 340. In particular embodiments, the reprojection unit reprojects 334 the frame N 310 based on the refined depth measurements 320 for the frame N 310 and the predicted pose at the frame N−1 350 to generate the estimated frame N−1 330. Likewise, the reprojection unit reprojects 344 the frame N 310 based on the refined depth measurements 320 for the frame N 310 and the predicted pose at the frame N+1 360 to generate the estimated frame N+1 340. The estimated frames N−1 330 and N+1 340 depict how the scene captured by the frame N 310 would likely appear if viewed from the user's new poses at the time the frames N−1 350 and N+1 360 are captured. In particular embodiments, the estimated frames N−1 330 and N+1 340 may be generated based on the method disclosed in FIG. 2.

The loss function unit of the training module receives the estimated frames N−1 330 and N+1 340 from the reprojection unit, and receives the captured frames N−1 350 and N+1 360 from the camera. In particular embodiments, the loss function unit compares the estimated frame N−1 330 to the captured frame N−1 350, and calculates a first loss 352 between the estimated frame N−1 330 and the captured frame N−1 350 based on a loss function. Furthermore, the loss function unit compares the estimated frame N+1 340 to the captured frame N+1 360, and calculates a second loss 362 between the estimated frame N+1 340 and the captured frame N+1 360 based on a loss function. The loss function unit may determine 370 a smaller loss from the first loss 352 and the second loss 362 to train the machine-learning model 314, so that the occlusions which cause a huge loss might not be considered in refining depth measurements. For example, the object may be a user walking in an environment in a series of frames, e.g., the frames N−1 350, N 310, and N+1 360. When the user walked by a white wall in the background or a chair in front of the user, the refined depth measurements in the series of frames might be still be accurate, but might not be computed based on the user, but based on the object which occludes the user, e.g., the chair in front of the user. By comparing the losses between at least two estimated frames and their corresponding captured frames, the loss function unit may be able to determine that a smaller loss at the time of the captured frame might not include occlusions and is suitable for training the machine-learning model 314. The loss function unit updates/trains the machine-learning model 314 with the smaller loss selected from the comparisons. Detailed operations and actions of training the machine-learning model 314 performed at the training module 300 may be further described in FIG. 8.

Figure 4:
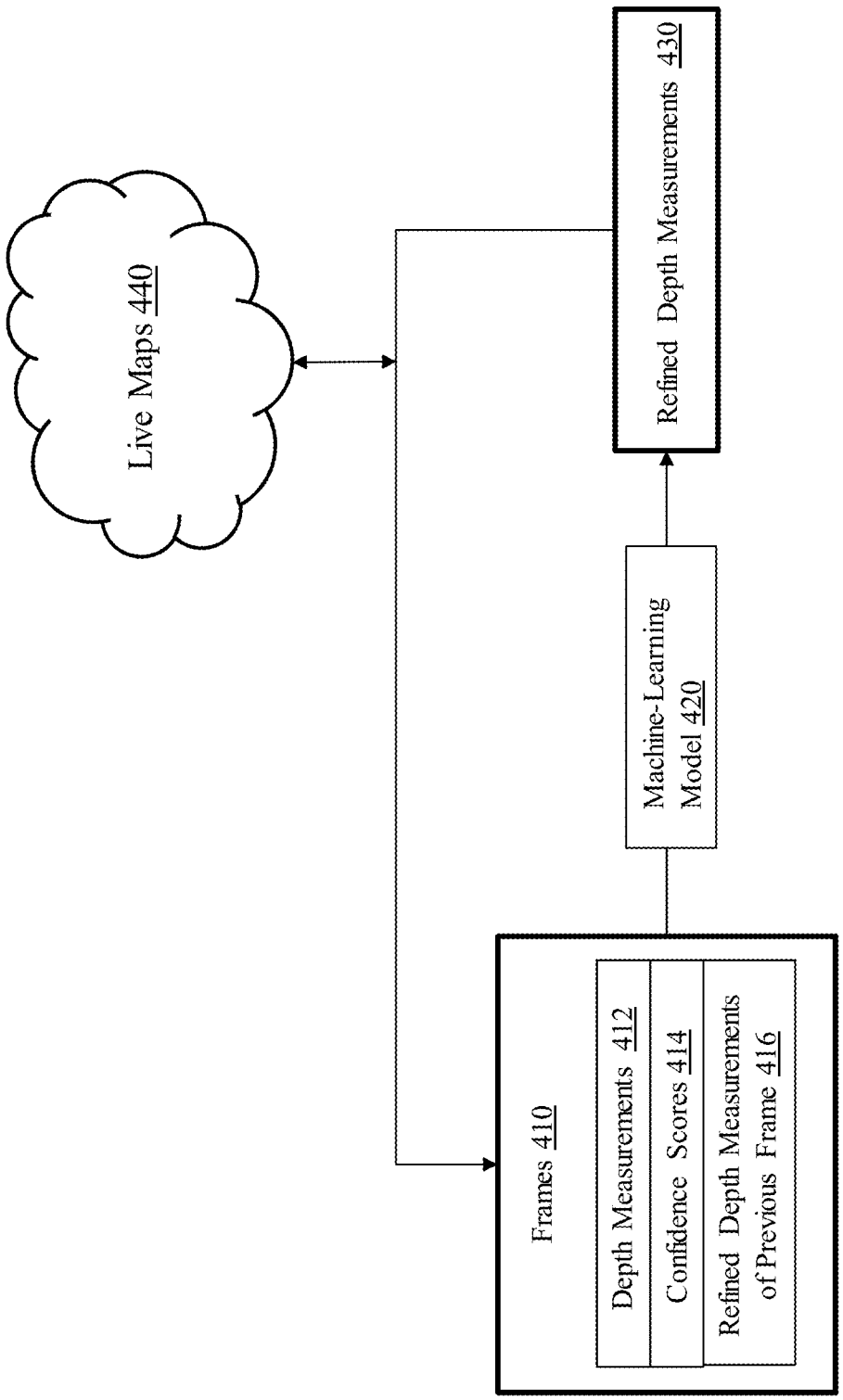
FIG. 4 illustrates an example diagram of a training module for training a machine-learning model to include the refined depth measurements of a previous frame in depth measurements.

FIG. 4 illustrates an example training method for training a machine-learning module that includes refined depth measurements from a previous frame and/or previous depth measurements as inputs, in accordance with certain embodiments. The training method can train the machine-learning model utilizing multiple frames from a video. As described above, the training method can provide real-time updates due to applying small neural networks and performing depth refinements to certain objects. Therefore, the training method can keep feeding a refined depth measurement of frame N back to the machine-learning model as one of the inputs for refining depth measurements of frame N+1 in real-time. In a video mode, this training method can form a loop recycling the refined depth measurement of a previous frame as input for the depth refinement of a current frame. In particular embodiments, the refined depth measurements of the previous frame may be reprojected to the machine-learning model for the depth refinements of the current frame based on a pose shift. The pose shift may be a pose shift determined using the camera. Furthermore, the training method can also introduce live maps data to the machine-learning model as input. The live maps data may comprise measured depth of static objects which might facilitate refining depth measurements. For example, pre-computed depth measurements of static objects can be reprojected to the machine-learning model for refining depth measurements of a current frame.

The depth refining system 100 comprises one or more cameras and at least one processor/module to process inputs for training the machine-learning model under a video mode. The camera of the depth refining system 400 may be configured to capture a video which comprises a series of frames 410 of the object. In particular embodiments, a frame 410 may be captured by the same or similar manners as described in FIGS. 1 to 3. In particular embodiments, the frame 410 may be the frames described in FIGS. 1 to 3.

The depth refining system 400 receives the series of frames 410, e.g., frame N−1, frame N, frame N+1, and processes a current frame, for example, frame N, in the series of frames 410 to generate depth measurements 412 of objects captured in the current frame. In particular embodiments, the depth measurements 412 of the current frame may be generated by the methods described in FIGS. 1 to 3. The depth measurements 412 have associated confidence scores 414 which indicate how reliable the depth measurements 412 are. In particular embodiments, the confidences scores 414 may be generated by the methods described in FIGS. 1 to 3.

Furthermore, the depth refining system 400 also receives a refined depth measurement 416 of a previous frame, e.g., frame N−1, as input for the machine-learning model 420 to generate depth measurements 412 of the current frame, e.g., frame N. In particular embodiments, the refined depth measurements of the previous frame 416 may be generated by the methods described in FIGS. 1 to 3. For example, the refined depth measurements of the previous frame 416 may be generated based on the previous frame, the estimated depth measurements of the previous frame, and confidence scores associated with the estimated depth measurements of the previous frame (e.g., the method disclosed in FIG. 1). As described previously, the refined depth measurements of the previous frame 416 can also be generated via a machine-learning model, which is trained by reprojecting a frame captured before the previous frame 416 based on a pose shift and the its depth measurements (e.g., the method disclosed in FIG. 2). The depth refining system 400 can utilize accumulated information, such as a reprojected, refined depth measurement of previous frames, constantly as input in a loop to train the machine-learning model 420 and output refined depth measurements 430 for the current frame.

Furthermore, the depth refining system 400 can also retrieve live maps 440 from a cloud or any suitable storage as input to train the machine-learning model 420. For example, the depth refining system 400 may retrieve live maps 440, e.g., depth measurements of static objects which is generated previously and is stored in the cloud, as input to train the machine-learning model 420. Moreover, the refined depth measurements 430 can later be integrated with live maps 440, which potentially can be used for global localization and/or extensive functions.

Figure 5A:
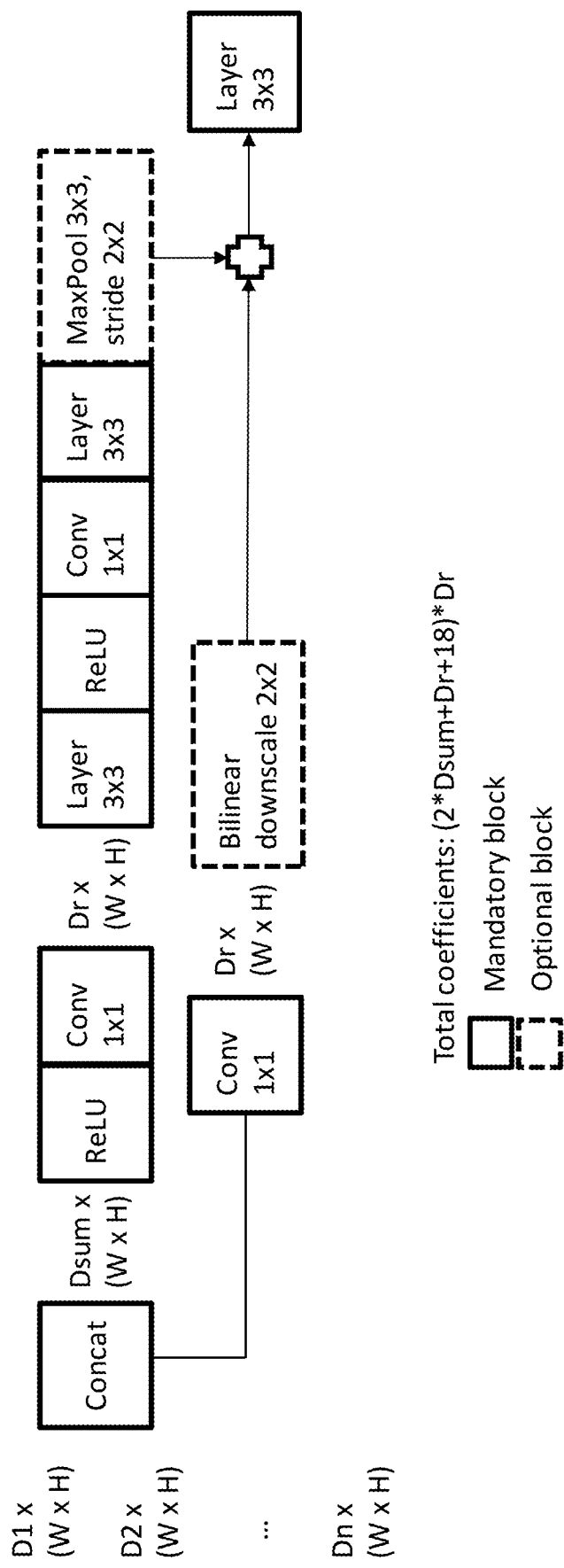
FIGS. 5A-5B illustrate example convolutional neural network architectures used in the depth refining system.
Figure 5B:
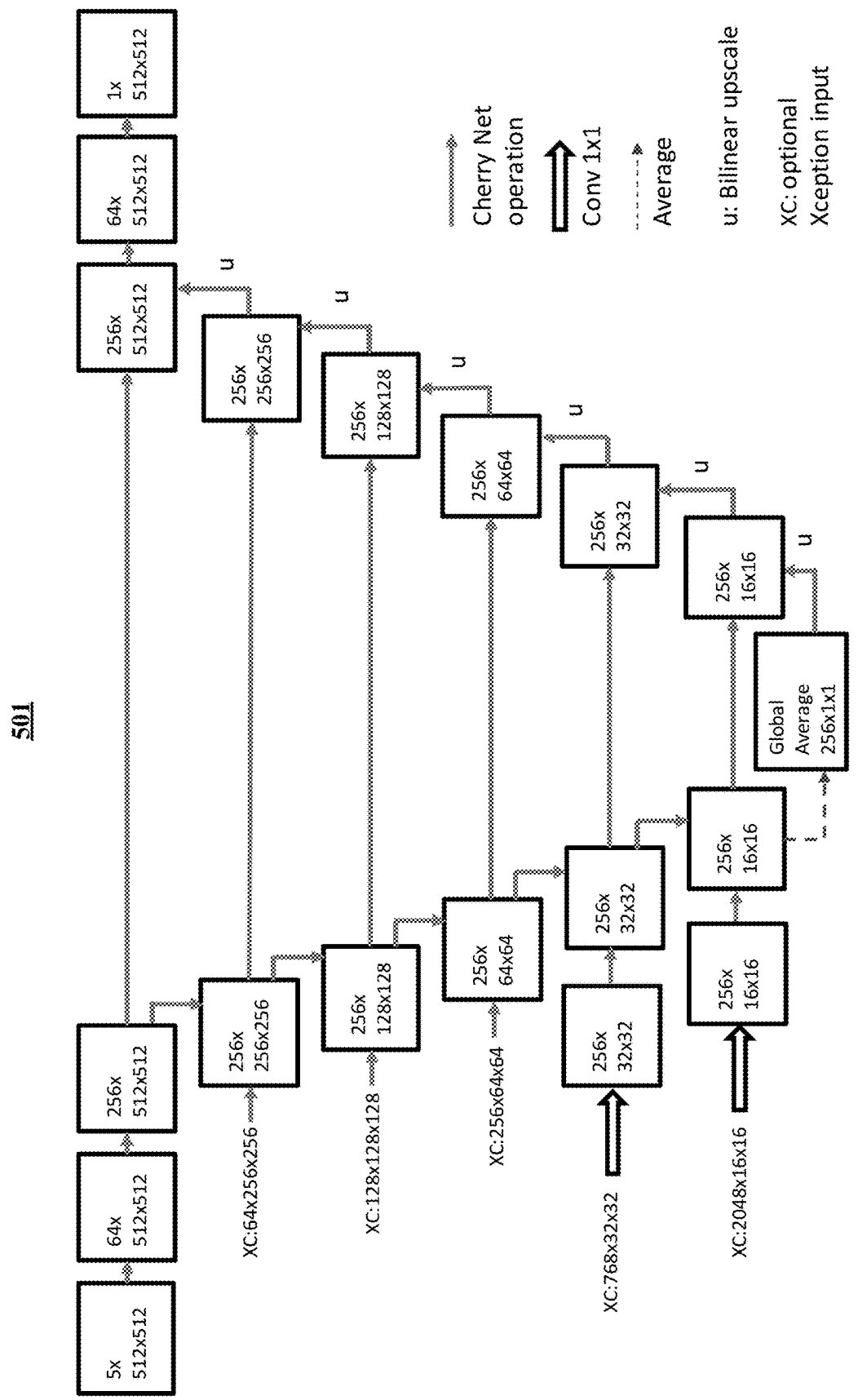

FIGS. 5A-5B illustrate example convolutional neural network architectures used in the depth refining system. The machine-learning mode disclosed in the present disclosure may be based on convolutional neural networks 500, 501. For example, particular embodiments of the convolutional neural networks 500, 501 may use encoder-decoder networks having a "U-Net" shape, with successive downsampling followed by up-sampling to produce the final image. The U-Net may be with skip connections which transfer the data between the units on the same level. The encoder-decoder architecture gives the output neurons a large receptive field, although to preserve detail in the final output, the skip connections from the encoder layers to corresponding decoder layers may be used. Alternatively, the network can maintain full resolution at all layers, without any pooling. Particular embodiments of convolutional neural networks disclosed in FIGS. 5A to 5B are illustrated as example embodiments used in the machine-learning model herein, but are not limited to the example embodiments.

Figure 6:
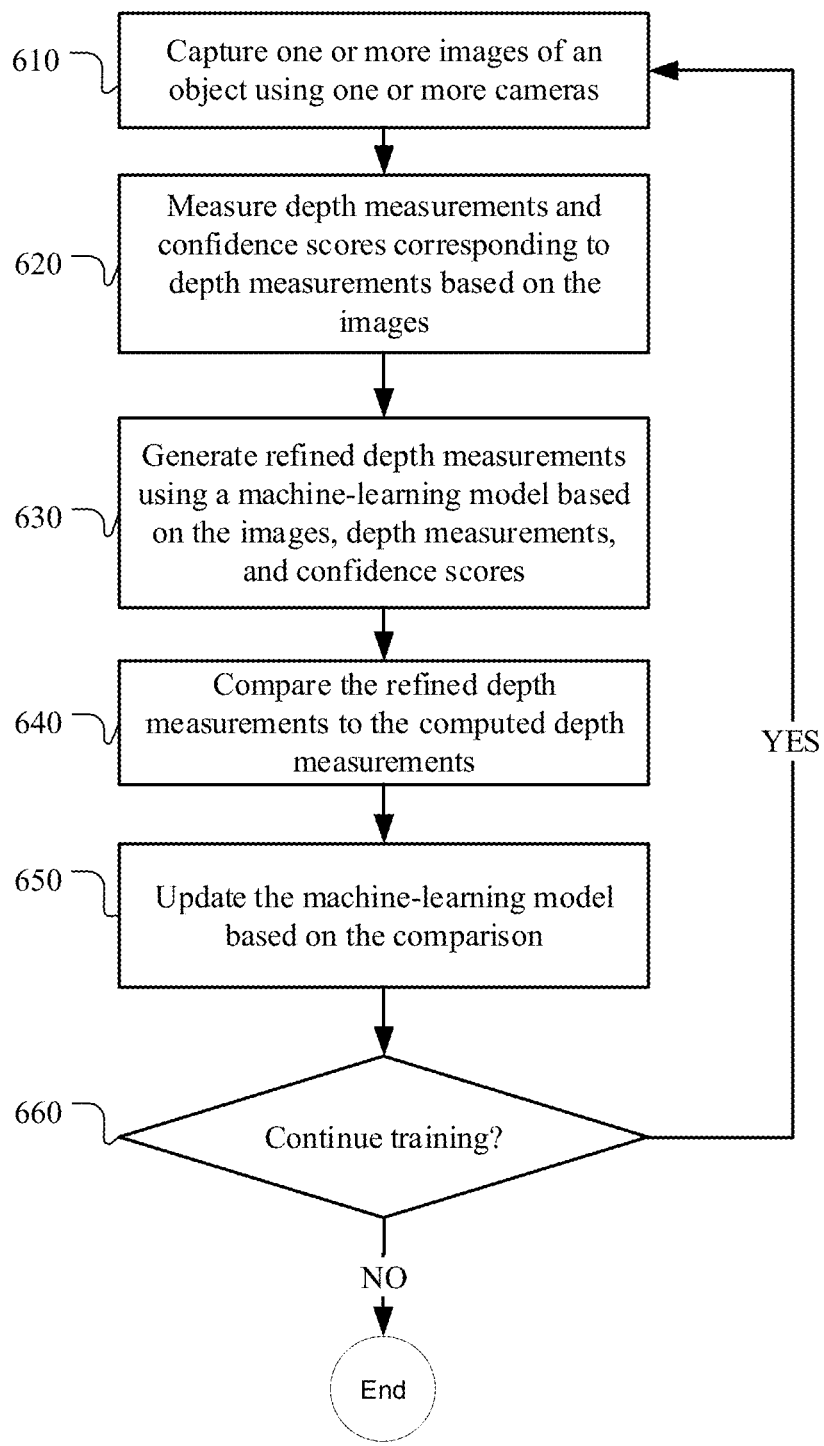
FIG. 6 illustrates an example method to train a machine-learning model for refining depth measurements based on a loss function.

FIG. 6 illustrates an example method 600 for training a machine-learning model to refine computed depth measurements, in accordance with certain embodiments. The method 600 may begin at step 610 capturing one or more images of an object using one or more cameras. In particular embodiments, the camera may be implemented in a head-mounted device. In particular embodiments, the method 600 may be performed in an off-device stage to further provide extensive services, e.g., image processing and global/local localization.

At step 620, the method 600 may measure depth measurements and confidence scores corresponding to depth measurements based on the captured images. In particular embodiments, the ground-truth/raw depth measurements may be computed or measured by various methods, e.g., high-end devices or advanced algorithms. For example, LiDAR, more accurate stereo measurement techniques algorithms, structured-light assisted computations, manual measurements, etc.). In particular embodiments, the depth measurements may be computed based on per-pixel depth computations. In particular embodiments, the depth measurements may be used to generate a corresponding depth map based on the per-pixel depth computations. In particular embodiments, the confidence scores may be associated with each pixel to generate a corresponding per-pixel confidence map for the depth measurements. Furthermore, the method 600 can generate various inputs based on the images, e.g., the corresponding per-pixel confidence map, to train the machine-learning model.

At step 630, the method 600 may generate refined depth measurements using a machine-learning model based on the images, depth measurements, and the confidence scores. In particular embodiments, the input to refine the depth measurements may be at least one of: the one or more images of the object, a corresponding depth map computed based on the depth measurements, and a corresponding confidence map based on the associated confidence scores.

At step 640, the method 600 may compare the refined depth measurements to the ground-truth depth measurements. In particular embodiments, the method 600 may calculate a loss based on the comparison between the ground-truth depth measurement and the refined depth measurements.

At step 650, the method 600 may update the machine-learning model based on the comparison at step 640. In particular embodiments, the method 600 may train the machine-learning model based on the loss between the ground-truth depth measurement and the refined depth measurements.

At step 660, the method 600 may determine whether to continue training. For example, the method 600 may determine whether the machine-learning model requires a further training based on a calculated loss between the ground-truth depth measurement and the refined depth measurements. For example, when a loss between the ground-truth depth measurement and the refined depth measurements is below a threshold, the method 600 may determine that the machine-learning model does not need to be trained, and may proceed to the end of training. On the other hand, if the loss between the ground-truth depth measurement and the refined depth measurements is above the threshold, the method 600 may proceed to step 610 to continue training the machine-learning model. In particular embodiments, the method 600 is determined that the training is completed based on a predetermined termination rule, such as a certain number of input image.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for local localization including the particular steps of the method of FIG. 6, this disclosure contemplates any suitable method for local localization including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
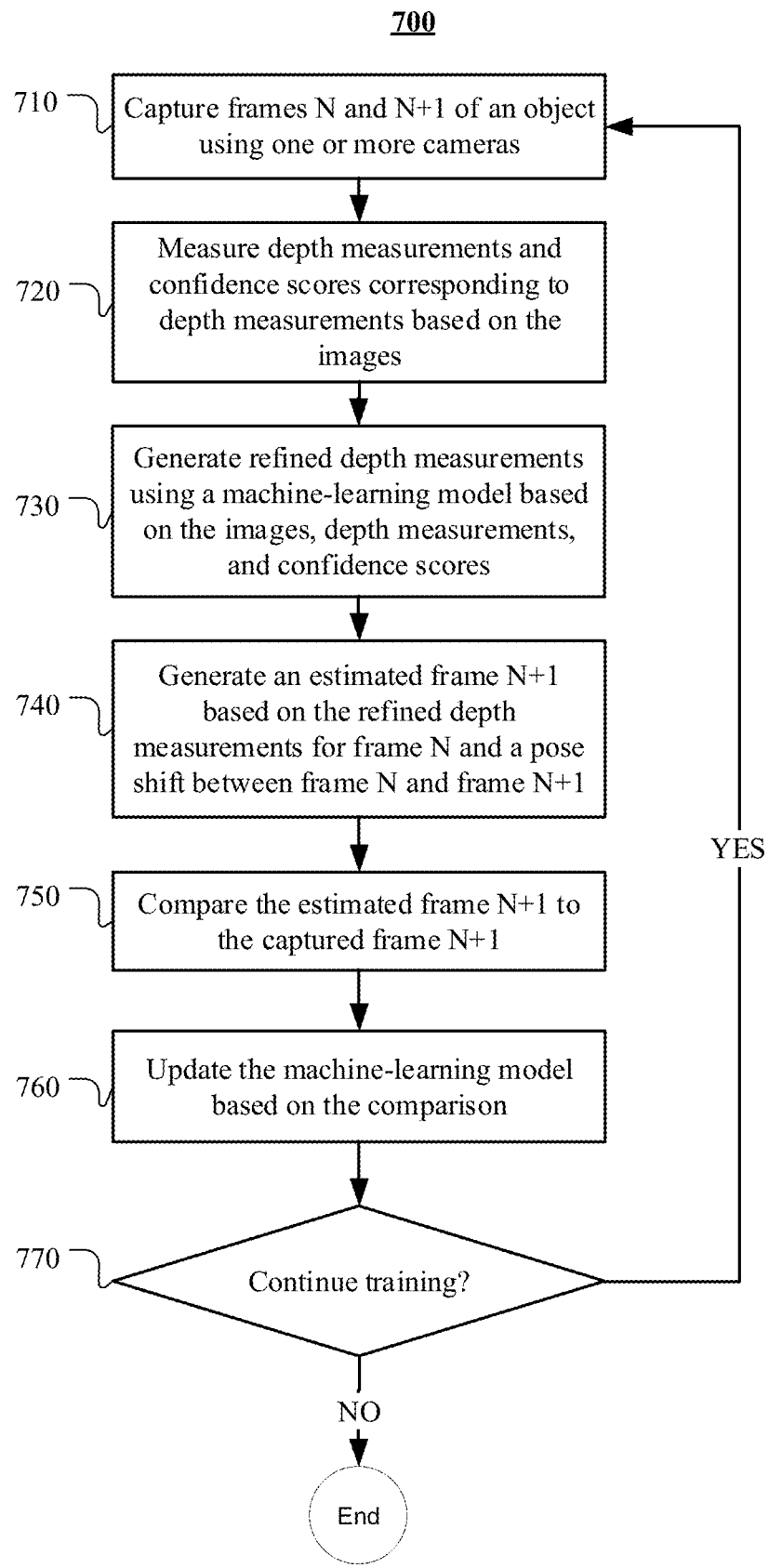
FIG. 7 illustrates an example method to train a machine-learning model for refining depth measurements without ground truth.

FIG. 7 illustrates an example method 700 for training a machine-learning model to refine depth measurements without a ground-truth depth measurement, in accordance with certain embodiments. The method 700 may begin at step 710 capturing frames N and N+1 of an object using one or more cameras. In particular embodiments, the camera may be implemented in a head-mounted device. In particular embodiments, the method 700 may be performed in an off-device stage to further provide extensive services, e.g., image refinements and global/local localization.

At step 720, the method 700 may measure depth measurements and confidence scores corresponding to depth measurements based on the frame N. In particular embodiments, the ground-truth/raw depth measurements of the frame N may be computed or measured by various methods, e.g., high-end devices or advanced algorithms. In particular embodiments, the depth measurements may be computed based on per-pixel depth computations. In particular embodiments, the depth measurements may be used to generate a corresponding depth map based on the per-pixel depth computations. In particular embodiments, the confidence scores may be associated with each pixel to generate a corresponding per-pixel confidence map for the depth measurements. Furthermore, the method 700 can generate various inputs based on the images, e.g., the corresponding per-pixel confidence map, to train the machine-learning model. In particular embodiments, the method 700 may generate depth measurements and confidence scores by the method described in FIG. 6.

At step 730, the method 700 may generate refined depth measurements using a machine-learning model based on the frame N, depth measurements, and the confidence scores. In particular embodiments, the method 700 may generate the refined depth measurements based on the frame N, ground-truth measurements of the frame N, and confidence scores for the ground-truth depth measurements based on the frame N. In particular embodiments, the frame N may be an RGB image, a grayscale image, a binary image, or any suitable type and format of images. In particular embodiments, the method 700 may utilize at least one of the frame N, the ground-truth depth measurements of the frame N, and the confidence scores based on the frame N using a machine-learning model trained by the method described in FIG. 6.

At step 740, the method 700 may generate an estimated frame N+1 based on the refined depth measurements for the frame N and a pose shift between the frame N and the frame N+1. In particular embodiments, the pose shift may be determined using SLAM. SLAM may provide estimated SLAM data which is processed based on sensor data from one or more sensors, e.g., the camera, implemented in the head-mounted device.

At step 750, the method 700 may compare the estimated frame N+1 to the captured frame N+1. In particular embodiments, the method 700 may calculate a loss based on the comparison between the estimated frame N+1 and the captured frame N+1.

At step 760, the method 700 may update the machine-learning model based on the comparison at step 750. In particular embodiments, the method 700 may train the machine-learning model based on the loss between the estimated frame N+1 and the captured frame N+1.

At step 770, the method 700 may determine whether to continue training. For example, the method 700 may determine whether the machine-learning model requires a further training based on a calculated loss between the estimated frame N+1 and the captured frame N+1. For example, when a loss between the estimated frame N+1 and the captured frame N+1 is below a threshold, the method 700 may determine that the machine-learning model does not need to be trained again, and may proceed to the end of training. On the other hand, if the loss between the estimated frame N+1 and the captured frame N+1 is above the threshold, the method 700 may proceed to step 710 to continue training the machine-learning model. In particular embodiments, the method 700 is determined that the training is completed based on a predetermined termination rule, such as a certain number of input image.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for local localization including the particular steps of the method of FIG. 7, this disclosure contemplates any suitable method for local localization including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
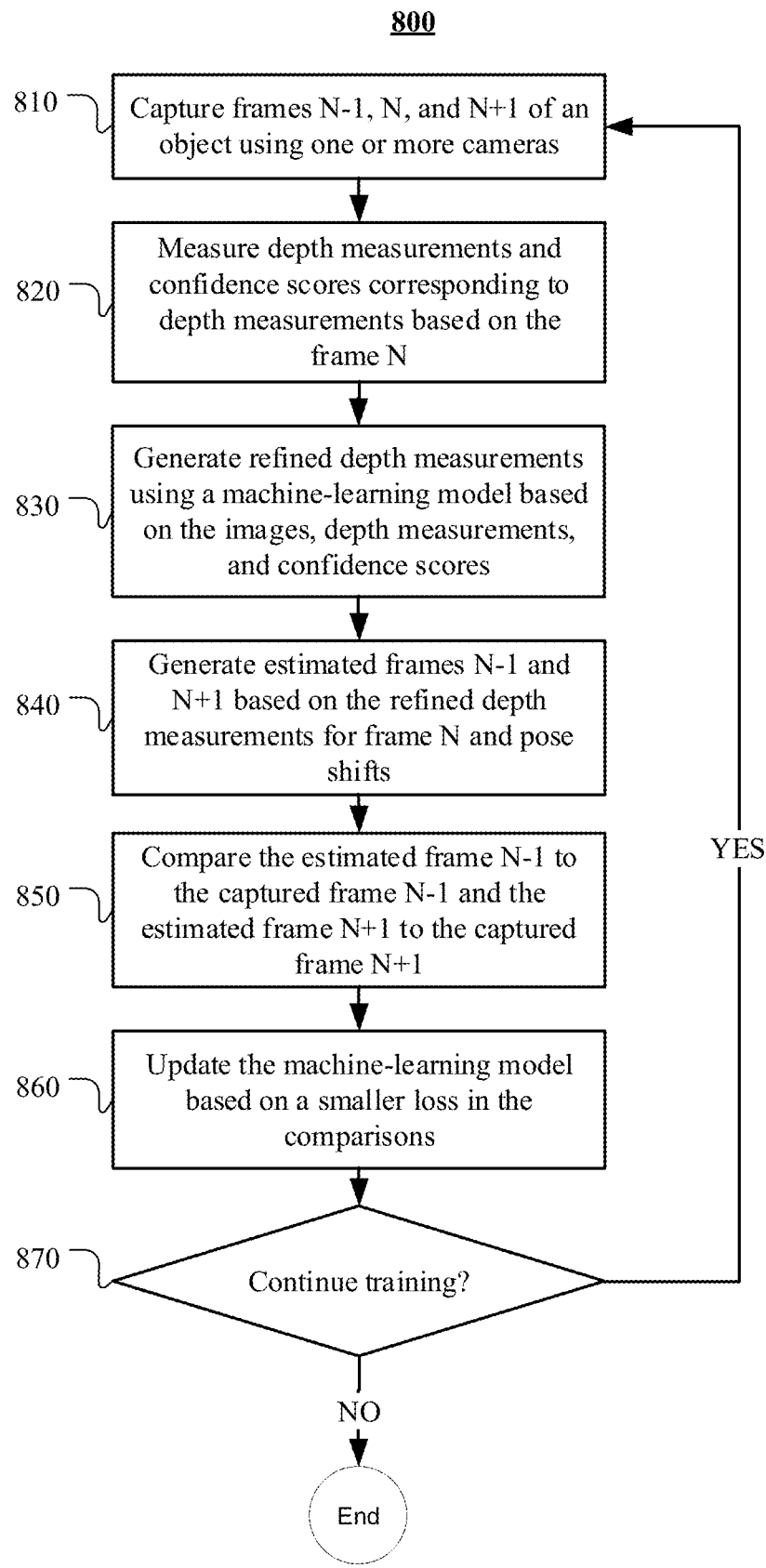
FIG. 8 illustrates an example method to train a machine-learning model for refining depth measurements by excluding occlusions.

FIG. 8 illustrates an example method 800 for training a machine-learning model to exclude occlusions in depth refinement, in accordance with certain embodiments. The method 800 may begin at step 810 capturing frames N−1, N and N+1 of an object using one or more cameras. In particular embodiments, the camera may be implemented in a head-mounted device. In particular embodiments, the method 800 may be performed in an off-device stage to further provide extensive services, e.g., image refinements and global/local localization.

At step 820, the method 800 may measure depth measurements and confidence scores corresponding to depth measurements based on the frame N. In particular embodiments, the ground-truth/raw depth measurements of the frame N may be computed or measured by various methods, e.g., high-end devices or advanced algorithms. In particular embodiments, the depth measurements may be computed based on per-pixel depth computations. In particular embodiments, the depth measurements may be used to generate a corresponding depth map based on the per-pixel depth computations. In particular embodiments, the confidence scores may be associated with each pixel to generate a corresponding per-pixel confidence map for the depth measurements. Furthermore, the method 800 can generate various inputs based on the images, e.g., the corresponding per-pixel confidence map, to train the machine-learning model. In particular embodiments, the method 800 may generate depth measurements and confidence scores by the method described in FIG. 6.

At step 830, the method 800 may generate refined depth measurements using a machine-learning model based on the frame N, depth measurements, and the confidence scores. In particular embodiments, the method 800 may generate the refined depth measurements based on the frame N, ground-truth measurements of the frame N, and confidence scores for the ground-truth depth measurements based on the frame N. In particular embodiments, the frame N may be an RGB image, a grayscale image, a binary image, or any suitable type and format of images. In particular embodiments, the method 800 may utilize at least one of the frame N, the ground-truth depth measurements of the frame N, and the confidence scores based on the frame N using a machine-learning model trained by the method described in FIG. 6.

At step 840, the method 800 may generate an estimated frame N−1 and an estimated N+1 based on the refined depth measurements for the frame N and pose shifts. In particular embodiments, the estimated frame N−1 may be generated based on the refined depth measurements for the frame N and a pose shift between a frame N−1 and the frame N. In particular embodiments, the estimated frame N+1 may be generated based on the refined depth measurements for the frame N and a pose shift between the frame N and a frame N+1. In particular embodiments, the pose shift may be determined using SLAM. SLAM may provide estimated SLAM data which is processed based on sensor data from one or more sensors, e.g., the camera, implemented in the head-mounted device. In particular embodiments, the method 800 may generate the estimated frame N−1 and the estimated frame N+1 by the method described in FIG. 7.

At step 850, the method 800 may compare the estimated frame N−1 to the captured frame N−1 and the estimated frame N+1 to the captured frame N+1 for determining a smaller loss from the comparisons. In particular embodiments, the method 800 may calculate a first loss based on the comparison between the estimated frame N−1 and the captured frame N−1. In particular embodiments, the method 800 may calculate a second loss based on the comparison between the estimated frame N+1 and the captured frame N+1. In particular embodiments, the method 800 may determine a smaller loss from the first loss and the second loss to train the machine-learning model.

At step 860, the method 800 may update the machine-learning model based on a smaller loss in the comparisons. In particular embodiments, the method 800 may train the machine-learning model based on the smaller loss selected from a loss between the estimated frame N−1 and the captured frame N−1 and a loss between the estimated frame N+1 and the captured frame N+1.

At step 860, the method 800 may determine whether to continue training. For example, the method 800 may determine whether the machine-learning model requires a further training based on a calculated loss, e.g., the loss used to update/train the machine-learning model in the previous iteration. In particular embodiments, the calculated loss may be a smaller loss selected from a loss between the estimated frame N−1 and the captured frame N−1 and a loss between the estimated frame N+1 and the captured frame N+1. For example, when the calculated loss is below a threshold, the method 800 may determine that the machine-learning model does not need to be trained again and may proceed to the end of training. On the other hand, if the calculated loss is above the threshold, the method 800 may proceed to step 810 to continue training the machine-learning model. In particular embodiments, the method 800 is determined that the training is completed based on a predetermined termination rule, such as a certain number of input image.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for local localization including the particular steps of the method of FIG. 8, this disclosure contemplates any suitable method for local localization including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
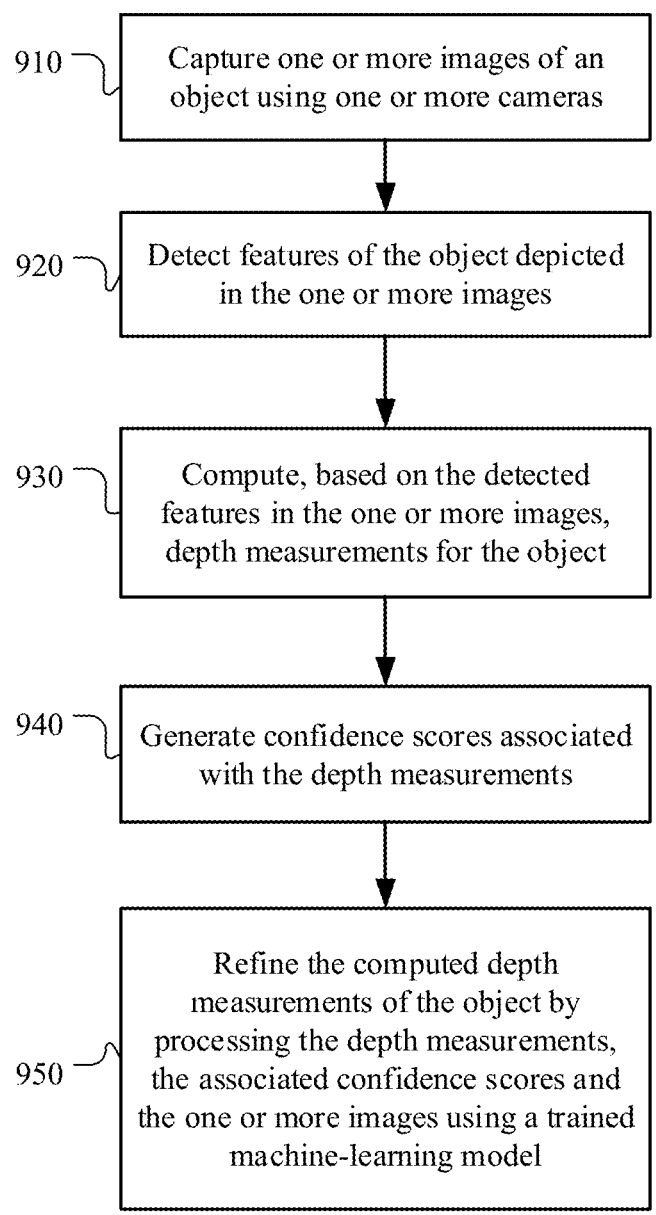
FIG. 9 illustrates an example method to refine depth measurements using a trained machine-learning model.

FIG. 9 illustrates an example method 900 for refining depth measurements, in accordance with certain embodiments. The method 900 may begin at step 910 capturing one or more images of an object using one or more cameras. In particular embodiments, the camera may be implemented in a head-mounted device. In particular embodiments, the method 900 may be performed in an off-device stage to further provide extensive services, e.g., image refinements and global/local localization.

At step 920, the method 900 may detect features of the object depicted in the one or more images.

At step 930, the method 900 may compute, based on the detected features in the one or more images, depth measurements for the object.

At step 940, the method 900 may generate confidence scores associated with the depth measurements.

At step 950, the method 900 may refining the computed depth measurements of the object by processing the depth measurements, the associated confidence scores, and at least one of the one or more images using a machine-learning model trained to refine depth measurements. In particular embodiments, refining the computed depth measurements may comprise utilizing at least one of the one or more images of the object, a corresponding depth map computed based on the computed depth measurements, and a corresponding confidence map based on the associated confidence scores as input, and generating a refined depth map based on the input to refine the computed depth measurements. In particular embodiments, the machine-learning model is configured to generate images for television monitors, cinema screens, computer monitors, mobile phones, or tablets.

In particular embodiments, the machine-learning model may be trained by comparing the refined depth map to the corresponding depth map to update the machine-learning model.

In particular embodiments, the machine-learning model may be trained by generating refined depth measurements for a captured image, generating an estimated subsequent image in a sequence of images based on the refined depth measurements for the captured image and a pose shift between the captured image and a captured subsequent image, and comparing the estimated subsequent image to the captured subsequent image to update the machine-learning model. In particular embodiments, generating the estimated subsequent image may comprise reprojecting the captured image using the refined depth measurements for the captured image and the pose shift between the captured image and the captured subsequent image. In particular embodiments, the pose shift may be determined using SLAM. SLAM may provide estimated SLAM data which is processed based on sensor data from one or more sensors, e.g., the camera, implemented in the head-mounted device.

In particular embodiments, the machine-learning model may be trained by generating refined depth measurements for a captured image, generating an estimated subsequent image in a sequence of images based on a predicted pose at the estimated subsequent image and the refined depth measurements for the captured image, generating an estimated previous image in the sequence of images based on a predicted pose at the estimated previous image and the refined depth measurements for the captured image, and comparing the estimated subsequent image to a captured subsequent image and comparing the estimated previous image to a captured previous image to update the machine-learning model. Furthermore, the comparing steps comprise calculating a first loss between the estimated subsequent image and the captured subsequent image, calculating a second loss between the estimated previous image and the captured previous image, and training the machine-learning model using a smaller loss selected from the first loss and the second loss. In particular embodiments, the predicted pose at the estimated subsequent image may be generated based on a pose shift between the captured image and the captured subsequent image, and the predicted pose at the estimated previous image may be generated based on a pose shift between the captured previous image and the captured image.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for local localization including the particular steps of the method of FIG. 9, this disclosure contemplates any suitable method for local localization including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
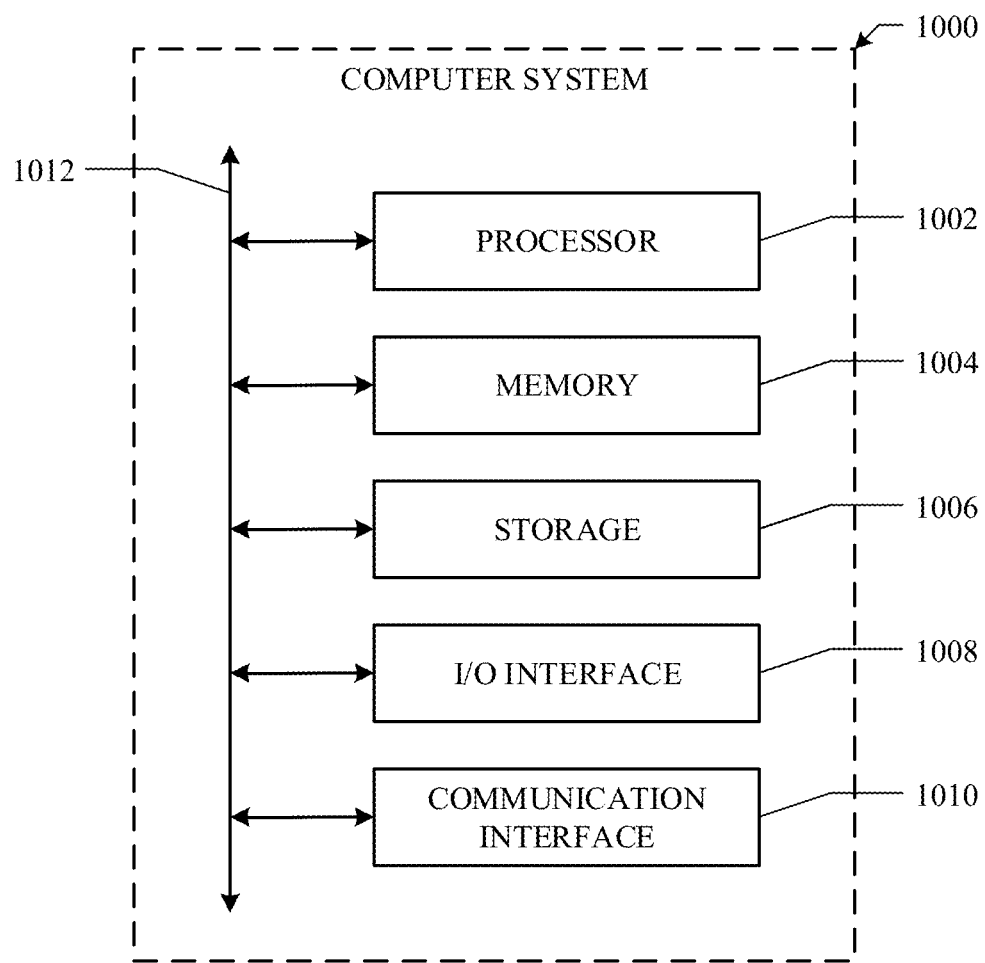
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006.

Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

According to various embodiments, an advantage of features herein is that a trained machine-learning model for refining depth measurements can efficiently improve the accuracy of depth measurements for an object captured by a camera. The machine-learning model can be trained with or without ground-truth data. Furthermore, the machine-learning model can be trained to account for occlusions in depth measurements by comparing multiple frames, e.g., at least two frames, to determine which frame might have occlusions. Therefore, particular embodiments disclosed in the present disclosure may provide an improved, accurate, cost-efficient depth measurements in the fields of imaging processing.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising, by a computing system:
    capturing one or more images of an object using one or more cameras;
    detecting features of the object depicted in the one or more images;
    computing, based on the detected features in the one or more images, depth measurements for the object, wherein each depth measurement corresponds to a pixel in at least one of the one or more images;
    generating confidence scores associated with the depth measurements, wherein a confidence score corresponding to a depth measurement indicates a degree of reliability on the depth measurement; and
    refining the computed depth measurements of the object by processing the depth measurements, the associated confidence scores, and at least one of the one or more images using a machine-learning model trained to refine depth measurements whose corresponding confidence scores are lower than a pre-determined threshold, wherein the machine-learning model is trained by:
        generating refined depth measurements for a captured image;
        generating an estimated subsequent image based on the refined depth measurements for the captured image and a pose shift between the captured image and a captured subsequent image; and
        comparing the estimated subsequent image to the captured subsequent image to update the machine-learning model.

2. The method of claim 1, wherein refining the computed depth measurements comprises:
    utilizing at least one of:
        the one or more images of the object;
        a corresponding depth map computed based on the computed depth measurements; and
        a corresponding confidence map based on the associated confidence scores, as input; and
    generating a refined depth map based on the input to refine the computed depth measurements.

3. The method of claim 2, wherein the machine-learning model is trained by:
    comparing the refined depth map to the corresponding depth map to update the machine-learning model.

4. The method of claim 1, wherein generating the estimated subsequent image comprises:
    reprojecting the captured image using the refined depth measurements for the captured image and the pose shift between the captured image and the captured subsequent image.

5. The method of claim 1, wherein the machine-learning model is further trained by:
    generating refined depth measurements for a captured image;
    generating an estimated subsequent image in a sequence of images based on a predicted pose at the estimated subsequent image and the refined depth measurements for the captured image;
    generating an estimated previous image in the sequence of images based on a predicted pose at the estimated previous image and the refined depth measurements for the captured image; and
    comparing the estimated subsequent image to a captured subsequent image and comparing the estimated previous image to a captured previous image to update the machine-learning model.

6. The method of claim 5, wherein the comparing step comprises:
    calculating a first loss between the estimated subsequent image and the captured subsequent image;
    calculating a second loss between the estimated previous image and the captured previous image; and
    training the machine-learning model using a smaller loss selected from the first loss and the second loss.

7. The method of claim 1, wherein refining the computed depth measurements comprises:
    utilizing at least one of:
        a current frame of the object;
        depth measurements of the current frame;
        corresponding confidence scores associated with the depth measurements of the current frame; and
        refined depth measurements of a previous frame reprojected to the machine-learning model for refining depth measurements of the current frame, as input; and
    generating refined depth measurements of the current frame based on the input via the machine-learning model.

8. The method of claim 7, wherein the input further comprises pre-computed depth measurements of static objects which are reprojected to the machine-learning model for refining depth measurements of the current frame.

9. The method of claim 1, wherein the object is hair, glass, flat surfaces, large surfaces, small or thin objects, black objects, repeating patterns, horizontal edges, glares, or over-exposed images.

10. One or more computer-readable non-transitory storage media embodying software that is operable when executed to:
    capture one or more images of an object using one or more cameras;
    detect features of the object depicted in the one or more images;
    compute, based on the detected features in the one or more images, depth measurements for the object, wherein each depth measurement corresponds to a pixel in at least one of the one or more images;
    generate confidence scores associated with the depth measurements, wherein a confidence score corresponding to a depth measurement indicates a degree of reliability on the depth measurement; and
    refine the computed depth measurements of the object by processing the depth measurements, the associated confidence scores, and at least one of the one or more images using a machine-learning model trained to refine depth measurements whose corresponding confidence scores are lower than a pre-determined threshold, wherein the machine-learning model is trained by:

generating refined depth measurements for a captured image;
generating an estimated subsequent image based on the refined depth measurements for the captured image and a pose shift between the captured image and a captured subsequent image; and
comparing the estimated subsequent image to the captured subsequent image to update the machine-learning model.

11. The media of claim 10, wherein refining the computed depth measurements comprises:
utilizing at least one of:
the one or more images of the object;
a corresponding depth map computed based on the computed depth measurements; and
a corresponding confidence map based on the associated confidence scores, as input; and
generating a refined depth map based on the input to refine the computed depth measurements.

12. The media of claim 11, wherein the machine-learning model is trained by:
comparing the refined depth map to the corresponding depth map to update the machine-learning model.

13. The media of claim 10, wherein generating the estimated subsequent image comprises:
reprojecting the captured image using the refined depth measurements for the captured image and the pose shift between the captured image and the captured subsequent image.

14. The media of claim 10, wherein the machine-learning model is further trained by:
generating refined depth measurements for a captured image;
generating an estimated subsequent image in a sequence of images based on a predicted pose at the estimated subsequent image and the refined depth measurements for the captured image;
generating an estimated previous image in the sequence of images based on a predicted pose at the estimated previous image and the refined depth measurements for the captured image; and
comparing the estimated subsequent image to a captured subsequent image and comparing the estimated previous image to a captured previous image to update the machine-learning model.

15. The media of claim 14, wherein the comparing step comprises:
calculating a first loss between the estimated subsequent image and the captured subsequent image;
calculating a second loss between the estimated previous image and the captured previous image; and
training the machine-learning model using a smaller loss selected from the first loss and the second loss.

16. The media of claim 10, wherein refining the computed depth measurements comprises:
utilizing at least one of:
a current frame of the object;
depth measurements of the current frame;
corresponding confidence scores associated with the depth measurements of the current frame; and
refined depth measurements of a previous frame reprojected to the machine-learning model for refining depth measurements of the current frame, as input; and
generating refined depth measurements of the current frame based on the input via the machine-learning model.

17. The media of claim 16, wherein the input further comprises pre-computed depth measurements of static objects which are reprojected to the machine-learning model for refining depth measurements of the current frame.

18. A system comprising: one or more processors; and one or more computer-readable non-transitory storage media coupled to one or more of the processors and comprising instructions operable when executed by one or more of the processors to cause the system to:
capture one or more images of an object using one or more cameras;
detect features of the object depicted in the one or more images;
compute, based on the detected features in the one or more images, depth measurements for the object, wherein each depth measurement corresponds to a pixel in at least one of the one or more images;
generate confidence scores associated with the depth measurements, wherein a confidence score corresponding to a depth measurement indicates a degree of reliability on the depth measurement; and
refine the computed depth measurements of the object by processing the depth measurements, the associated confidence scores, and at least one of the one or more images using a machine-learning model trained to refine depth measurements whose corresponding confidence scores are lower than a pre-determined threshold, wherein the machine-learning model is trained by:
generating refined depth measurements for a captured image;
generating an estimated subsequent image based on the refined depth measurements for the captured image and a pose shift between the captured image and a captured subsequent image; and
comparing the estimated subsequent image to the captured subsequent image to update the machine-learning model.

* * * * *